(12) United States Patent
Narita et al.

(10) Patent No.: US 10,234,033 B2
(45) Date of Patent: Mar. 19, 2019

(54) VEHICLE MANUAL TRANSMISSION

(71) Applicants: TOYOTA JIDOSHA KABUSHIKI KAISHA, Toyota-shi, Aichi-ken (JP); AISIN AI CO., LTD, Nishio-shi, Aichi-ken (JP)

(72) Inventors: Ryuji Narita, Toyota (JP); Kota Ichisawa, Toyota (JP); Koji Naito, Nagoya (JP); Yuki Habara, Chita-gun (JP)

(73) Assignees: TOYOTA JIDOSHA KABUSHIKI KAISHA, Toyota (JP); AISIN AI CO., LTD., Nishio-shi (JP)

( * ) Notice: Subject to any disclaimer, the term of this patent is extended or adjusted under 35 U.S.C. 154(b) by 354 days.

(21) Appl. No.: 15/175,471

(22) Filed: Jun. 7, 2016

(65) Prior Publication Data

US 2016/0363220 A1 Dec. 15, 2016

(30) Foreign Application Priority Data

Jun. 11, 2015 (JP) .................................. 2015-118738

(51) Int. Cl.
*F16H 63/32* (2006.01)

(52) U.S. Cl.
CPC ....... *F16H 63/32* (2013.01); *F16H 2063/321* (2013.01); *F16H 2063/322* (2013.01); *F16H 2063/324* (2013.01)

(58) Field of Classification Search
CPC ............... F16H 63/32; F16H 2063/322; F16H 2063/324; F16H 2063/321

(Continued)

(56) References Cited

U.S. PATENT DOCUMENTS 4,353,449 A * 10/1982 Lamy ...................... F16H 63/32
192/82 R
6,164,151 A * 12/2000 Dutson ................... F16H 63/32
192/82 R (Continued)

FOREIGN PATENT DOCUMENTS

DE 102008047019 A1 * 3/2010 ............. F16H 63/32
JP 58-157032 U 10/1983

(Continued)

OTHER PUBLICATIONS

Oct. 31, 2016 Extended Search Report issued in European Patent Application No. 16173783.8.

*Primary Examiner* — William C Joyce
(74) *Attorney, Agent, or Firm* — Oliff PLC (57) ABSTRACT

A vehicle manual transmission includes: shift fork shafts; shift forks; sleeves; and gear pieces. Each of the shift forks is coupled with the shift fork shaft so as to be moved together. Each of the sleeves has an annular shape. The sleeve includes an annular sliding groove to be fitted to the shift fork on an outer peripheral surface of the sleeve. The sleeve includes peripheral edges forming annular planes as viewed in the longitudinal direction of the shift fork shaft. Each of the gear pieces includes outer peripheral teeth to be meshed with inner peripheral teeth formed on an inner peripheral surface of the sleeve when the sleeve is moved in accordance with the gear shift operation. The shift fork shaft or the shift fork includes a restricting member that abuts to the peripheral edge so as to restrict a movement of the sleeve in a longitudinal direction.

5 Claims, 5 Drawing Sheets

(58) Field of Classification Search
USPC .................................................. 74/473.37
See application file for complete search history.

(56) References Cited

U.S. PATENT DOCUMENTS 9,097,339 B2 * 8/2015 Skogward ............... F16H 63/32
2011/0314948 A1 12/2011 Schulze et al.

FOREIGN PATENT DOCUMENTS

| JP | 2004-204880 A | 7/2004 |
| JP | 2008-032166 A | 2/2008 |
| JP | 2013-124685 A | 6/2013 |
| JP | 2014-222070 A | 11/2014 |
| RU | 2504704 C2 | 1/2014 |

* cited by examiner

VEHICLE MANUAL TRANSMISSION

INCORPORATION BY REFERENCE

The disclosure of Japanese Patent Application No. 2015-118738 filed on Jun. 11, 2015 including the specification, drawings and abstract is incorporated herein by reference in its entirety.

BACKGROUND OF THE INVENTION

1. Field of the Invention

The present invention relates to a manual transmission provided to a vehicle.

2. Description of Related Art

In manual transmissions provided to vehicles, there have commonly been well-known mechanisms, each including: a shift fork shaft moved in a longitudinal direction in accordance with a shift operation by a driver; a shift fork coupled with the shift fork shaft; and an annular sleeve having an outer peripheral surface on which an annular sliding groove to be fitted to the shift fork is formed. In a manual transmission described in Japanese Patent Application Publication No. 2008-32166, there is disclosed a shift fork provided with sliding contact protrusions coming into sliding contact with a sliding groove of a sleeve in a stepwise manner in accordance with a magnitude of a load applied to the shift fork.

SUMMARY OF THE INVENTION

In the manual transmission of JP 2008-32166 A, if a driver carries out a gear shift operation, in order to mesh inner peripheral teeth (meshed teeth) formed on an inner peripheral surface of the sleeve with outer peripheral teeth (meshed teeth) formed on a gear piece adjacent to the sleeve, the sleeve is moved in the longitudinal direction of the shift fork shaft. In a state in which the sleeve and the gear piece are out of synchronous rotation, the sleeve is repelled by the gear piece, so that the sleeve is relatively moved in an axial direction relative to the shift fork. At this time, the sliding contact protrusions of the shift fork collide against the sliding groove formed in the sleeve; therefore, the sliding groove of the sleeve might be abraded. If the sliding groove becomes abraded, abrasion particles and or abrasion marks might cause increase in sliding resistance of the sleeve.

The present invention provides a structure of a vehicle manual transmission capable of suppressing abrasion of a sliding groove of a sleeve.

A vehicle manual transmission according to one aspect of the present invention includes: shift fork shafts; shift forks; sleeves; and gear pieces. Each of the shift fork shafts is supported by the vehicle manual transmission such that the shift fork shaft is moved in a longitudinal direction in accordance with a gear shift operation by a driver. Each of the shift forks is coupled with the shift fork shaft so as to be moved together with a movement of the shift fork shaft. Each of the sleeves has an annular shape. The sleeve includes an annular sliding groove to be fitted to the shift fork on an outer peripheral surface of the sleeve. The sleeve includes peripheral edges forming annular planes as viewed in the longitudinal direction of the shift fork shaft. Each of the gear pieces includes outer peripheral teeth to be meshed with inner peripheral teeth formed on an inner peripheral surface of the sleeve when the sleeve is moved in accordance with the gear shift operation. The shift fork shaft or the shift fork includes a restricting member that abuts to the peripheral edge so as to restrict a movement of the sleeve in the longitudinal direction of the shift fork shaft.

In the vehicle manual transmission according to the above aspect, in a state in which the sleeve and the gear piece are out of synchronous rotation, if a gear shift operation is carried out, and the sleeve is repelled by the gear piece, the restricting member provided outside the sliding groove comes into contact with the peripheral edge of the sleeve formed outside the sliding groove. Hence, the sliding groove of the sleeve can be prevented from colliding against the shift fork, thus suppressing friction of the sliding groove.

In the vehicle manual transmission according to the above aspect, the restricting member may include two protrusions that oppose each other with the shift fork interposed therebetween in the longitudinal direction of the shift fork shaft. According to the aspect, it is possible to support the sleeve by one of the two protrusions depending on the moving direction of the shift fork shaft.

In the vehicle manual transmission according to the above aspect, the restricting member may be disposed at a position where a distance between the shift fork shaft and the sleeve becomes the shortest as viewed in the longitudinal direction of the shift fork shaft, and the position is also adjacent to the shift fork in the longitudinal direction of the shift fork shaft. According to the aspect, the restricting member is disposed at a position where the distance between the shift fork shaft and the sleeve becomes the smallest as viewed in the longitudinal direction of the shift fork shaft, and the position is also adjacent to the shift fork in the longitudinal direction of the shift fork shaft; therefore, it is possible to reduce a moment applied to the restricting member when the peripheral edge of the sleeve comes into contact with the restricting member.

In the vehicle manual transmission according to the above aspect, the shift fork shaft may be a press-formed platy member. According to the aspect, in the case of forming the restricting member on the shift fork shaft side, the shift fork shaft and the restricting member may be internally formed, thus facilitating formation of the restricting member.

In the vehicle manual transmission according to the above aspect, there may be provided a predetermined gap between the restricting member and the sleeve in the longitudinal direction of the shift fork shaft. According to the aspect, in the state in which the sleeve and the gear piece are out of synchronous rotation, if no gear shift operation is carried out, the sleeve is out of contact with the restricting member, thus suppressing heating due to friction between the sleeve and the restricting member, thereby enhancing the life duration of the sleeve.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the present invention will be described in details with reference to drawings, hereinafter. In the following embodiments, the drawings are appropriately simplified or deformed, and a dimensional ratio, a shape, and others of each component are not always described in a strict manner.

Figure 1:
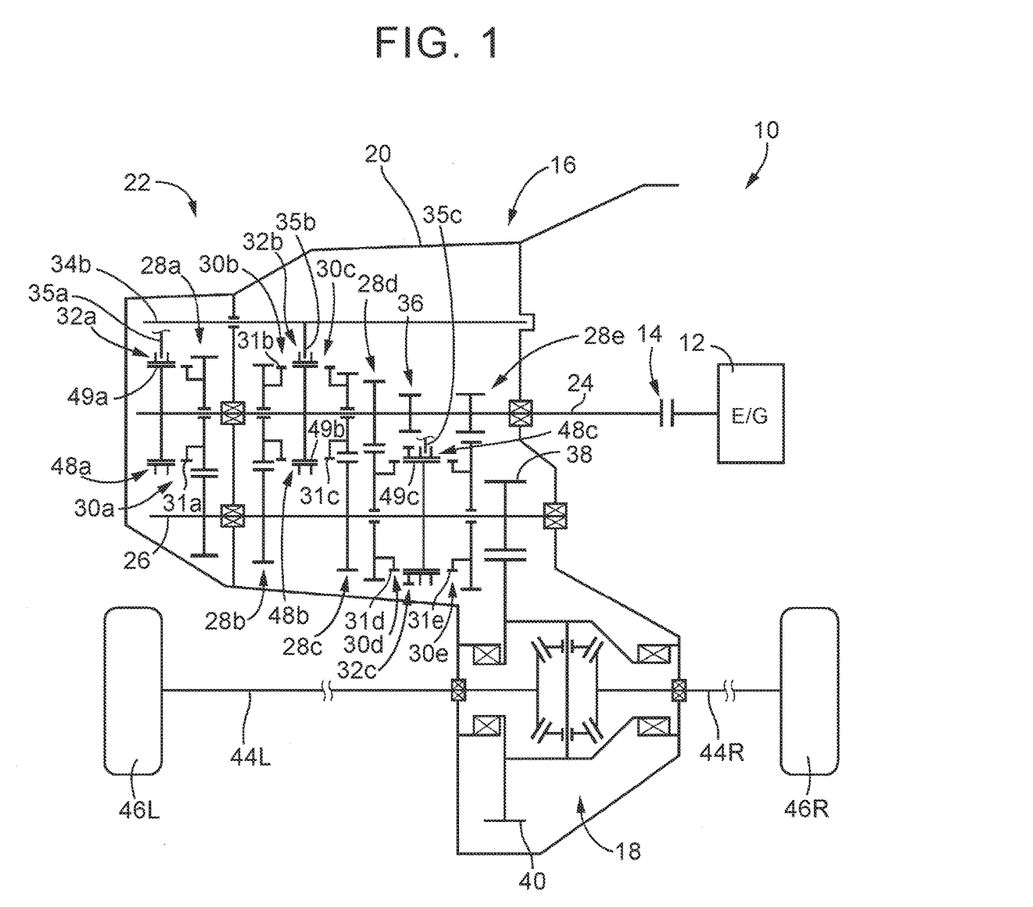
FIG. 1 is a drawing showing essential parts of a vehicle driving system equipped with a vehicle manual transmission to which the present invention is applied.

FIG. 1 is a drawing showing essential parts of a vehicle driving system 10 to which the present invention is applied. The vehicle driving system 10 in FIG. 1 includes an engine 12 as a driving source for traveling, a clutch 14, a vehicle manual transmission 16 (referred to as a "manual transmission 16", hereinafter), and a differential gear unit 18.

The manual transmission 16 and the differential gear unit 18 are both housed in a case 20. The manual transmission 16 includes a transmission mechanism of a parallel shaft type provided with plural shift gear pairs 28a to 28e having different gear ratios between an input shaft 24 and an output shaft 26 in pair that are parallel with each other in a vehicle width direction, and also with plural gear pieces 30a to 30e corresponding to the respective shift gear pairs 28a to 28e; and the manual transmission 16 further includes three shift fork shafts 34a, 34b, 34c (shift fork shafts 34a, 34c are not shown) used for changing a shift position by selectively activating any one of three synchronization mechanisms 32a to 32c corresponding to the gear pieces 30a to 30e so as to bring any one of the shift gear pairs 28a to 28e into a power transmission state, thereby establishing 1 to 5 forward-drive shift positions. A reverse gear pair 36 is further provided between the input shaft 24 and the output shaft 26, and the reverse gear pair 36 is meshed with a reverse idle gear disposed to a not-shown output shaft, thereby establishing a rearward-drive shift position. An output gear 38 to be meshed with a final gear 40 of the differential gear unit 18 is formed on the output shaft 26.

In FIG. 1, only the shift fork shaft 34b used for activating the synchronization mechanism 32b is illustrated, and the shift fork shafts 34a, 34c are not illustrated; but actually, the shift fork shaft 34a used for activating the synchronization mechanism 32a and the shift fork shaft 34c used for activating the synchronization mechanism 32c are arranged in line along with the shift fork shaft 34b. A shift fork 35a (described later) to be fitted to the sleeve 48a of the synchronization mechanism 32a is coupled with the shift fork shaft 34a (not shown), a shift fork 35b to be fitted to the sleeve 48b of the synchronization mechanism 32b is coupled with the shift fork shaft 34b, and a shift fork 35c (described later) to be fitted to the sleeve 48c of the synchronization mechanism 32c is coupled with the shift fork shaft 34c (not shown). Accordingly, each shift fork 35a to 35c moves in the longitudinal direction together with the movement in the longitudinal direction of each shift fork shaft 34a to 34c.

Any one of the shift fork shafts 34a to 34c is operated, thereby activating any one of the synchronization mechanisms 32a to 32c. For example, the synchronization mechanism 32c is activated to connect the gear piece 30e to the output shaft 26 so that the shift gear pair 28e comes into a power transmission state, thereby establishing a first shift position having a greatest transmission ratio (rotation speed of the input shaft 24/rotation sheep of the output shaft 26). The synchronization mechanism 32c is activated to connect the gear piece 30d to the output shaft 26 so that the shift gear pair 28d comes into the power transmission state, thereby establishing a second shift position having a second greatest transmission ratio. The synchronization mechanism 32b is activated to connect the gear piece 30c to the input shaft 24 so that the shift gear pair 28c comes into the power transmission state, thereby establishing a third shift position having a third greatest transmission ratio. The synchronization mechanism 32b is activated to connect the gear piece 30b to the input shaft 24 so that the shift gear pair 28b comes into the power transmission state, thereby establishing a fourth shift position having a fourth greatest transmission ratio. The synchronization mechanism 32a is activated to connect the gear piece 30a to the input shaft 24 so that the shift gear pair 28a comes into the power transmission state, thereby establishing a fifth shift position having a smallest transmission ratio.

The differential gear unit 18 is configured to include a differential mechanism to apply an appropriate difference in rotation speed to right and left front axles 44L, 44R connected to right and left front wheels 46L, 46R depending on the vehicle driving condition so as to enable a smooth steering. The differential gear unit 18 is well-known, and thus detailed description regarding configurations and operations thereof will be omitted.

Each synchronization mechanism 32a to 32c includes each annular sleeve 48a to 48c having an outer peripheral surface on which a sliding groove to be fitted to each corresponding shift fork 35a to 35c is formed, and having an inner peripheral surface on which each inner peripheral teeth 49a to 49c is formed. If the sleeve 48a of the synchronization mechanism 32a is moved toward the gear piece 30a side in the axial direction of the input shaft 24, the synchronization mechanism 32a is activated to synchronously rotate the sleeve 48a and the gear piece 30a, thereby allowing the inner peripheral teeth 49a of the sleeve 48a to be meshed with the outer peripheral teeth 31a of the gear piece 30a, that is, allowing the sleeve 48a to be meshed with the gear piece 30a. The sleeve 48a is meshed with the gear piece 30a, thereby connecting the gear piece 30a to the input shaft 24 via the sleeve 48a.

If the sleeve 48b of the synchronization mechanism 32b is moved toward the gear piece 30b side in the axial direction of the input shaft 24, the synchronization mechanism 32b is activated to synchronously rotate the sleeve 48b and the gear piece 30b, thereby allowing the inner peripheral teeth 49b of the sleeve 48b to be meshed with the outer peripheral teeth 31b of the gear piece 30b, that is, allowing the sleeve 48b to be meshed with the gear piece 30b. The sleeve 48b is meshed with the gear piece 30b, thereby connecting the gear piece 30b to the input shaft 24 via the sleeve 48b.

If the sleeve 48b of the synchronization mechanism 32b is moved toward the gear piece 30c side in the axial direction of the input shaft 24, the synchronization mechanism 32b is activated to synchronously rotate the sleeve 48b and the gear piece 30c, thereby allowing the inner peripheral teeth 49b of the sleeve 48b to be meshed with the outer peripheral teeth 31c of the gear piece 30c, that is, allowing the sleeve 48b to be meshed with the gear piece 30c. The sleeve 48b is meshed with the gear piece 30c, thereby connecting the gear piece 30c to the input shaft 24 via the sleeve 48b.

If the sleeve 48c of the synchronization mechanism 32c is moved toward the gear piece 30d side in the axial direction of the output shaft 26, the synchronization mechanism 32c is activated to synchronously rotate the sleeve 48c and the gear piece 30d, thereby allowing the inner peripheral teeth 49c of the sleeve 48c to be meshed with the outer peripheral teeth 31d of the gear piece 30d, that is, allowing the sleeve 48c to be meshed with the gear piece 30d. The sleeve 48c is meshed with the gear piece 30d, thereby connecting the gear piece 30d to the output shaft 26 via the sleeve 48c.

If the sleeve 48c of the synchronization mechanism 32c is moved toward the gear piece 30e side in the axial direction of the output shaft 26, the synchronization mechanism 32c is activated to synchronously rotate the sleeve 48c and the gear piece 30e, thereby allowing the inner peripheral teeth 49c of the sleeve 48c to be meshed with the outer peripheral teeth 31e of the gear piece 30e, that is, allowing the sleeve 48c to be meshed with the gear piece 30e. The sleeve 48c is meshed with the gear piece 30e, thereby connecting the gear piece 30e to the output shaft 26 via the sleeve 48c. The synchronization mechanisms 32a to 32c are a well-known technique, and thus detailed description regarding configurations and operations thereof will be omitted.

Figure 2:
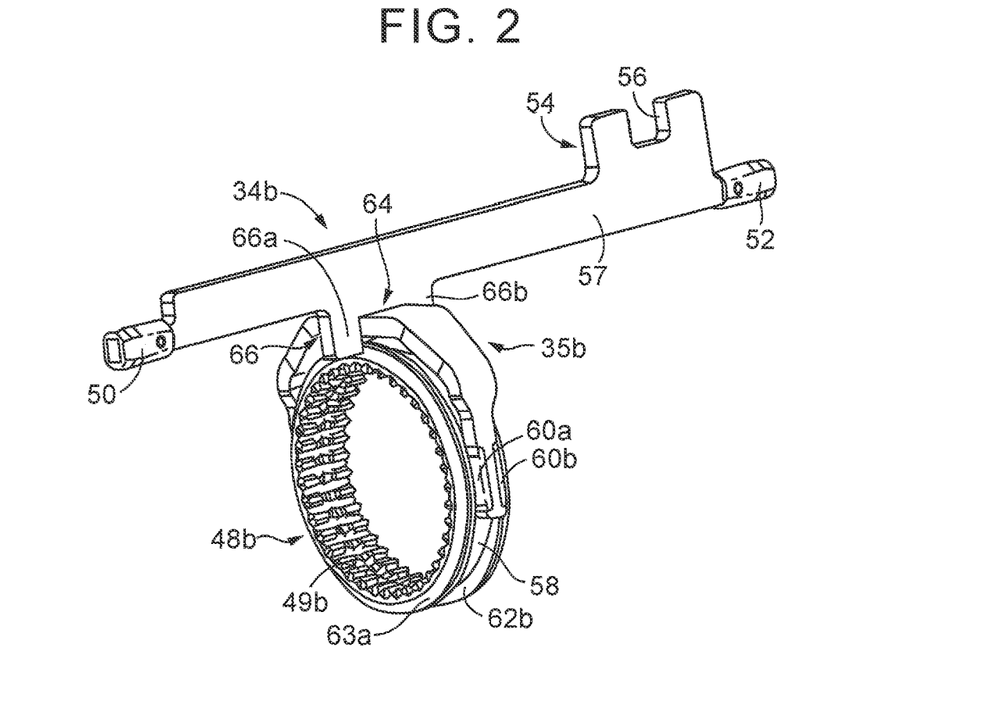
FIG. 2 is a perspective view showing structures of a shift fork shaft, a shift fork fixed to the shift fork shaft, and a sleeve fitted to the shift fork in FIG. 1.

FIG. 2 is a perspective view of the shift fork shaft 34b, the shift fork 35b coupled with the shift fork shaft 34b, and the sleeve 48b fitted to the shift fork 35b. The shift fork shafts 34a, 34c, the shift forks 35a, 35c, and the sleeves 48a, 48c basically have the same configurations as those in the perspective view of FIG. 2, and thus description thereof will be omitted.

As shown in FIG. 2, the shift fork shaft 34b (referred to as the "fork shaft 34b", hereinafter) is formed by a long plate (platy member), and support members 50, 52 to support the fork shaft 34b are provided at both longitudinal ends of the fork shaft 34b. An engaging portion 54 is formed at a portion of the fork shaft 34b closer to the support member 52 in the longitudinal direction of the fork shaft 34b. The engaging portion 54 extends vertically to the longitudinal direction of the fork shaft 34b, and a cut-out 56 is formed in a part of the engaging portion 54, so that the engaging portion 54 has a shape branching into two. A not-shown pushing member is engaged with a space defined by the cut-out 56 through a selecting operation (gear shift operation) by a driver. The pushing member is moved in the longitudinal direction of the fork shaft 34b through a shifting operation (gear shift operation) by the driver, thereby pushing the fork shaft 34b by the pushing member via the engaging portion 54 in the longitudinal direction of the fork shaft 34b so that the fork shaft 34b is moved in the longitudinal direction. The shift fork shaft 34b of the present embodiment is formed by press-forming a platy member.

Figure 3:
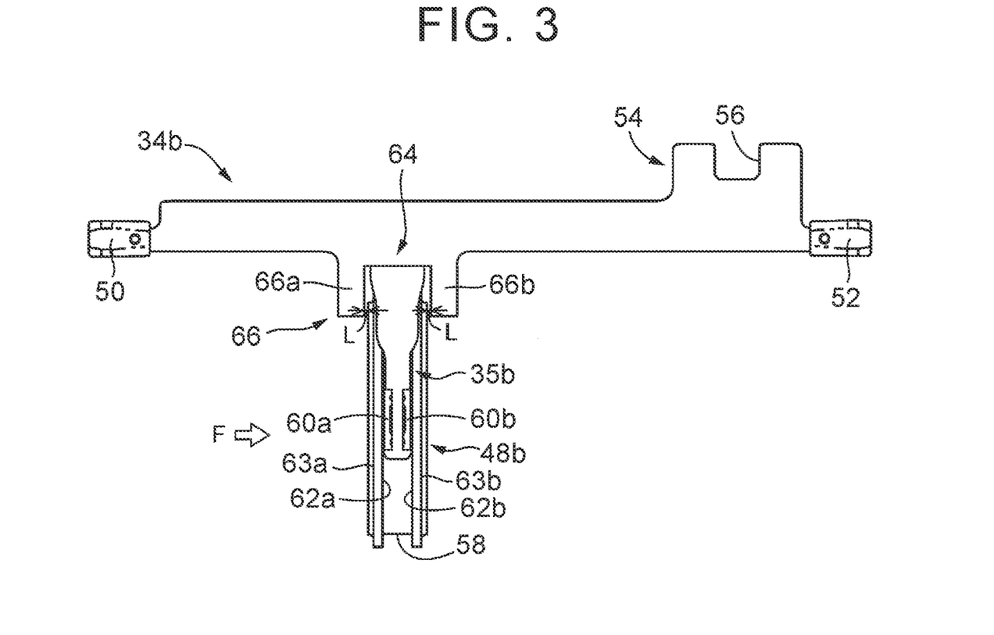
FIG. 3 is a drawing as viewed in a vertical direction relative to a plate surface of the shift fork shaft in FIG. 2.
Figure 4:
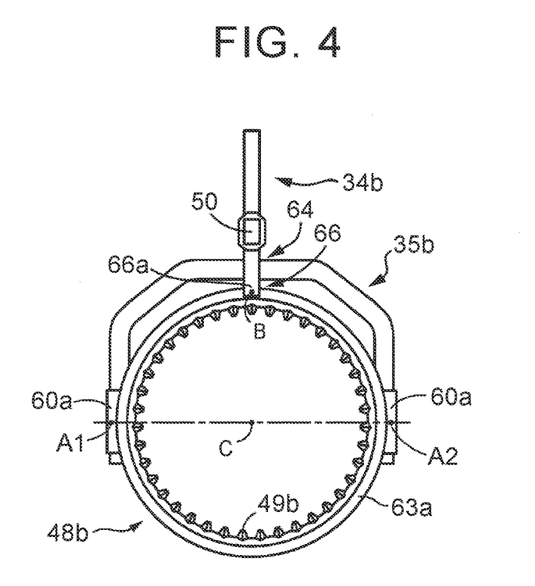
FIG. 4 is a drawing as viewed in a longitudinal direction of the shift fork shaft in FIG. 2.

The shift fork 35b is coupled with the fork shaft 34b at a predetermined position in the longitudinal direction of the fork shaft 34b. The shift fork 35b is joined to the fork shaft 34b through welding, for example. The shift fork 35b is fitted to the sleeve 48b. FIG. 3 corresponds to a drawing as viewed in a vertical direction relative to a plate surface 57 of the fork shaft 34b in FIG. 2. FIG. 4 corresponds to a drawing as viewed from the support member 50 side in the longitudinal direction of the fork shaft 34b in FIG. 2.

As shown in FIG. 2 and FIG. 4, the shift fork 35b is formed in a substantially U-shape that is bilateral symmetry to a joint portion 64 between the shift fork 35b and the fork shaft 34b as viewed in the longitudinal direction of the fork shaft 34b. Both ends of the shift fork 35b extending in the U-shape are fitted in an annular sliding groove 58 formed on an outer peripheral surface of the sleeve 48b. The sliding groove 58 of the sleeve 48b is formed in a center portion of the outer peripheral surface of the sleeve 48b formed in a cylindrical shape in the longitudinal direction of the fork shaft 34b if the sleeve 48b is assembled relative to the fork shaft 34b. At the both ends of the sliding groove 58 in the longitudinal direction of the fork shaft 34b, there are formed sliding contact surfaces 62a, 62b coming into sliding contact with the shift fork 35b when the sleeve 48b is relatively moved in the longitudinal direction of the fork shaft 34b relative to the shift fork 35b. The sleeve 48b is provided with a pair of peripheral edges 63a, 63b, each forming an annular plane if the sleeve 48b is viewed in the longitudinal direction of the fork shaft 34b. The peripheral edges 63a, 63b are both ends of the sleeve 48b in the longitudinal direction of the fork shaft 34b, and are formed on corresponding back surfaces of the sliding contact surfaces 62a, 62b.

A pair of resin pads 60a and a pair of resin pads 60b are fitted in the both ends of the shift fork 35b. When the sleeve 48b is relatively moved in the longitudinal direction of the fork shaft 34b relative to the shift fork 35, the resin pads 60a come into sliding contact with the sliding contact surface 62a formed in the sliding groove 58, or the resin pads 60b come into sliding contact with the sliding contact surface 62b formed in the sliding groove 58. As shown in FIG. 4, in the present embodiment, a line passing through contact points A1, A2, each of which comes into contact with the sleeve 48b, of the resin pads 60a fitted in the both ends of the shift fork 35b extends to a position passing through an axial center C of the sleeve 48b.

The fork shaft 34b includes a restricting member 66 extending from each position adjacent to the shift fork 35b in the longitudinal direction of the fork shaft 34b toward the axial center C of the sleeve 48b. The restricting member 66 is configured by two protrusions 66a, 66b that oppose each other, and extend from both sides adjacent to the shift fork 35b in the longitudinal direction of the fork shaft 34b toward the axial center C of the sleeve 48b. Specifically, the restricting member 66 is configured by the protrusions 66a, 66b that oppose each other, and extend from respective positions in the fork shaft 34b that hold the shift fork 35b from the both sides in the longitudinal direction of the fork shaft 34b toward the axial center C of the sleeve 48. As shown in FIG. 3, each of the protrusions 66a, 66b has a rectangular parallelepiped shape. The protrusions 66a, 66b are formed together with the fork shaft 34b when the fork shaft 34b is press-formed.

As viewed in the longitudinal direction of the fork shaft 34b, at least parts of the protrusions 66a, 66b extend to positions overlaid with the corresponding peripheral edges 63a, 63b of the sleeve 48b. The portions of the protrusions 66a, 66b overlaid with the sleeve 48b as viewed in the longitudinal direction are located outward of the sliding groove 58 of the sleeve 48b in the longitudinal direction of the fork shaft 34b. This means that the portions of the protrusions 66a, 66b overlaid with the sleeve 48b as viewed in the longitudinal direction are located at positions that are not overlaid with the sliding groove 58 in the longitudinal direction of the fork shaft 34b.

Each protrusion 66a, 66b is located at a position where the distance between the fork shaft 34b and the sleeve 48b becomes the shortest as viewed in the longitudinal direction of the fork shaft 34b, and the position is also adjacent to the shift fork 35b in the longitudinal direction of the fork shaft 34*b*. In the longitudinal direction of the fork shaft 34*b*, there are provided predetermined gaps L between the respective protrusions 66*a*, 66*b* and the corresponding peripheral edges 63*a* and 63*b* of the sleeve 48*b*, as shown in FIG. 3.

Operations of the above configured fork shaft 34*b*, shift fork 35*b*, and sleeve 48*b* will be described hereinafter. In FIG. 3, the fork shaft 34*b* is pushed by the not-shown pushing member in the longitudinal direction so as to move the fork shaft 34*b* toward the support member 50 side in the longitudinal direction, and the shift fork 35*b* fixed to the fork shaft 34*b* is also moved toward the support member 50 side, thereby bringing the resin pads 60*a* fitted in the both ends of the shift fork 35*b* to slidingly contact with the sliding contact surface 62*a* formed by the sliding groove 58 of the sleeve 48*b*. Through this, the sleeve 48*b* is moved toward the support member 50 side in the longitudinal direction of the fork shaft 34*b* so as to activate the synchronization mechanism 32*b*, thereby engaging the sleeve 48*b* with the gear piece 30*b*.

Specifically, if the sleeve 48*b* is out of engagement with the gear piece 30*b*, the gear piece 30*b* is located at a position closer to the support member 50 from the sleeve 48*b* in the longitudinal direction of the fork shaft 34*b*, and the position is also adjacent to the sleeve 48*b* in the longitudinal direction of the fork shaft 34*b*. The gear piece 30*b* includes outer peripheral teeth 31*b* formed at a position where the outer peripheral teeth 31*b* can be meshed with the inner peripheral teeth 49*b* of the sleeve 48*b*. Specifically, as viewed in the longitudinal direction of the fork shaft 34*b*, the outer peripheral teeth 31*b* of the gear piece 30*b* are located at a position overlaid with (at the same position in the radial direction of) the inner peripheral teeth 49*b* of the sleeve 48*b*. A not-shown synchronizer ring functioning as a friction member of the synchronization mechanism 32*b* is interposed between the sleeve 48*b* and the gear piece 30*b*. When the sleeve 48*b* is moved toward the support member 50 side in the longitudinal direction of the fork shaft 34*b*, a friction surface of the synchronizer ring interposed between the sleeve 48*b* and the gear piece 30*b* is pushed, thereby generating a friction force on the friction surface. This friction force reduces the difference in rotation speed between the sleeve 48*b* and the gear piece 30*b*. When the sleeve 48*b* and the gear piece 30*b* come into a synchronous rotation state, the inner peripheral teeth 49*b* formed on the inner peripheral surface of the sleeve 48*b* and the outer peripheral teeth 31*b* formed on the gear piece 30*b* come into a state of being able to be meshed with each other. In this state, if the sleeve 48*b* is further moved toward the support member 50 side in the longitudinal direction of the fork shaft 34*b*, the inner peripheral teeth 49*b* of the sleeve 48*b* is meshed with the outer peripheral teeth 31*b* of the gear piece 30*b*, thereby engaging the sleeve 48*b* with the gear piece 30*b*.

The fork shaft 34*b* is moved toward the support member 52 side in the longitudinal direction, and the shift fork 35*b* fixed to the fork shaft 34*b* is also moved toward the support member 52 side, thereby bringing the resin pads 60*b* fitted in the both ends of the shift fork 35*b* to slidingly contact with the sliding contact surface 62*b* formed by the sliding groove 58 of the sleeve 48*b*. Through this, the sleeve 48*b* is moved toward the support member 52 side in the longitudinal direction of the fork shaft 34*b* to activate the synchronization mechanism 32*b* so that the sleeve 48*b* is engaged with the gear piece 30*c*. A specific operation of the engagement is the same as that of the aforementioned engagement between the sleeve 48*b* and the gear piece 30*b*, and thus description thereof will be omitted.

For example, if the gear shift operation is carried out while the sleeve 48*b* and the gear piece 30*b* are out of synchronous rotation, and the sleeve 48*b* is moved toward the gear piece 30*b* side, the inner peripheral teeth 49*b* of the sleeve 48*b* collide against the outer peripheral teeth 31*b* of the gear piece 30*b*, so that the sleeve 48*b* is repelled in a backward direction by the gear piece 30*b*; and at this time, a great load F greater than a load in the gear shift operation in the synchronous rotation state is inputted into the sleeve 48*b*. The great load F is transmitted to the shift fork 35*b* through the contacts point A1, A2, and there is a longer distance between each contact point A1, A2 and the joint portion 64, and thus a moment applied to the joint portion 64 between the fork shaft 34*b* and the shift fork 35*b* becomes greater. To cope with this, in a solution of the related art, enhancement of rigidity of the shift fork and increase in joint area of the joint portion 64 are employed, but there are also problems, such as deterioration of shift feeling, and increase in dimension and increase in weight of the apparatus. As another solution, there has been proposed to provide further sliding contact protrusions to slidingly contact with the sliding groove of the sleeve, but the contact of the protrusions with the sliding groove might cause abrasion of the sliding groove. Such abrasion of the sliding groove might cause increase in sliding resistance of the sleeve due to abrasion particles and abrasion marks.

To the contrary, in the present embodiment, the fork shaft 34*b* includes the restricting member 66 that abuts to the peripheral edges 63*a*, 63*b* of the sleeve 48*b* so as to restrict the movement of the sleeve 48*b* in the longitudinal direction of the fork shaft 34*b*. This restricting member 66 receives part of the great load F so as to reduce the moment applied to the joint portion 64; therefore, it is possible to suppress increase in rigidity of the shift fork 35*b* and increase in joint area of the joint portion 64. Hereinafter, the operation when the great load F is inputted into the sleeve 48*b*.

In FIG. 3, the great load F is inputted into the sleeve 48*b* in an arrow direction, for example, the great load F is transmitted from the contact points A1, A2 to the shift fork 35*b*. At this time, the shift fork 35*b* becomes bent toward the support member 52 side in the longitudinal direction of the fork shaft 34*b*, so that the peripheral edge 63*b* of the sleeve 48*b* comes into contact with the protrusion 66*b* included in the restricting member 66, thereby restricting the movement of the sleeve 48*b* in the longitudinal direction of the fork shaft 34*b*. The peripheral edge 63*b* of the sleeve 48*b* abuts to the restricting member 66, thereby receiving part of the great load F by the protrusion 66*b*. Because a distance between the joint portion 64 and a contact point B of the protrusion 66*b* with the sleeve 48*b* is short, and thus a moment from the load received by the protrusion 66*b* becomes smaller. A load applied to the contact points A1, A2 of the shift fork 35*b* with the sleeve 48*b* (sliding groove 58) also becomes smaller, and thus a moment from the load received by the contact points A1, A2 also becomes smaller. As a result, since the moment applied to the joint portion 64 becomes smaller, it becomes unnecessary to increase the rigidity of the shift fork 35*b* and increase the joint area of the joint portion 64. Accordingly, it is possible to suppress deterioration of shift feeling due to increase in rigidity of the shift fork 35*b*. Similarly, it is possible to suppress increase in dimension and increase in weight of the apparatus due to increase in rigidity of the shift fork 35 and increase in joint area of the joint portion 64. Since the protrusion 66*b* is located at a position that is not overlaid with the sliding groove 58 of the sleeve 48*b* in the longitudinal direction, the protrusion 66*b* is prevented from coming into contact with the sliding contact surface 62b of the sliding groove 58 if the sleeve 48b and the shift fork 35b move relative to each other in the longitudinal direction. Accordingly, it is possible to prevent abrasion of the sliding contact surface 62b due to the contact between the protrusion 66b and the sliding contact surface 62b of the sliding groove 58.

The gap L is provided between the protrusion 66b and the peripheral edge 63b of the sleeve 48b in the longitudinal direction of the fork shaft 34b, and the gap L is set to have a value that allows the protrusion 66b to come into contact with the peripheral edge 63b of the sleeve 48b when the great load F is inputted to bend the shift fork 35b. Hence, if no great load F is inputted into the sleeve 48b, the protrusion 66b can be prevented from coming into contact with the peripheral edge 63b of the sleeve 48b. Accordingly, if no gear shift operation is carried out while the sleeve 48b and the gear piece 31b are out of synchronous rotation, heat generation due to friction between the protrusion 66b and the peripheral edge 63b of the sleeve 48b can be prevented, thus promoting enhancement of the life duration of the sleeve 48b.

If the great load F is applied to the sleeve 48b in a reverse direction to a direction indicated by the arrow in FIG. 3, part of the great load F can be received by the protrusion 66a. Accordingly, the moment applied to the joint portion 64 can be reduced, thus promoting the same effect as the aforementioned effect. In addition, in FIG. 2 to FIG. 4, the fork shaft 34b, the shift fork 35b, and the sleeve 48b are described, and the fork shafts 34a, 34c, the shift forks 35a, 35c, and the sleeves 48a, 48c are configured in the same manner, thus attaining the same effect.

As aforementioned, according to the present embodiment, in the state in which the sleeve 48b and the gear piece 30b are out of synchronous rotation, if the gear shift operation is carried out, and the sleeve 48b is repelled by the gear piece 30b, the restricting member 66 provided outside the sliding groove 58 comes into contact with the peripheral edge 63b of the sleeve 48b formed outside the sliding groove 58. Hence, the sliding groove 58 of the sleeve 48b can be prevented from colliding against the shift fork 35b, thus suppressing friction of the sliding groove 58.

According to the present embodiment, the restricting member 66 is configured by the two protrusions 66a, 66b opposing each other with the shift fork 35 (35a to 35c) interposed therebetween in the longitudinal direction of the fork shaft 34; therefore, it is possible to support the sleeve 48 by one of the protrusions 66a, 66b depending on the movement direction of the fork shaft 34.

According to the present embodiment, the restricting member 66 is disposed at a position where the distance between the fork shaft 34 and the sleeve 48 becomes the smallest as viewed in the longitudinal direction of the fork shaft 34, and the position is also adjacent to the shift fork in the longitudinal direction of the fork shaft 34; therefore, it is possible to reduce a moment applied to the restricting member 66 when the peripheral edges 63a, 63b of the sleeve 48 come into contact with the restricting member 66.

According to the present embodiment, the fork shaft 34 is a press-formed platy member; therefore, in the case of forming the restricting member 66 on the fork shaft 34 side, the fork shaft 34 and the restricting member 66 may be integrally formed, thus facilitating formation of the restricting member 66.

According to the present embodiment, the predetermined gaps L are respectively formed between the protrusions 66a, 66b of the restricting member 66 and the peripheral edges 63a, 63b of the sleeve 48 in the longitudinal direction of the shift fork shaft 34. Hence, in the state in which the sleeve 48 and the gear piece 30 are out of synchronous rotation, if no gear shift operation is carried out, the sleeve 48 is out of contact with the restricting member 66, thus suppressing heating due to friction between the sleeve 48 and the restricting member 66, thereby enhancing the life duration of the sleeve 48.

Another embodiment of the present invention will be described, hereinafter. In the following description, the same reference numerals will be used for the portions common to the aforementioned embodiment, and description thereof will be omitted.

Figure 5:
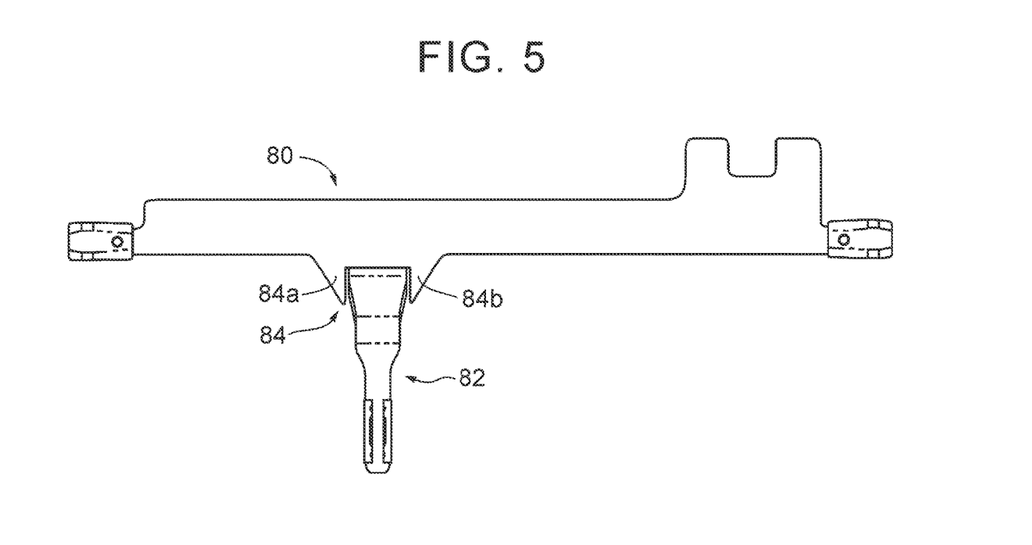
FIG. 5 is a drawing showing shapes of a shift fork shaft and a shift fork that are applied to a vehicle manual transmission as another embodiment of the present invention.

FIG. 5 is a drawing showing shapes of a shift fork shaft 80 (referred to as a "fork shaft 80", hereinafter) and a shift fork 82 that are applied to the vehicle manual transmission as another embodiment of the present invention, and the drawing corresponds to FIG. 3 of the aforementioned embodiment.

The fork shaft 80 of the present embodiment includes two protrusions 84a, 84b opposing each other with the shift fork 82 interposed therebetween at a position adjacent to the shift fork 82 in the longitudinal direction of the fork shaft 80. A restricting member 84 is configured by the protrusions 84a, 84b. As shown in FIG. 5, each protrusion 84a, 84b is formed in a triangular prism shape by being punched with press-forming. Even if each protrusion 84a, 84b is formed in a triangular prism shape, the shift fork 82 becomes bent when the great load F is inputted, so that a peripheral edge (not shown in FIG. 5) of the sleeve comes into contact with the protrusions 84a, 84b, and the protrusions 84a, 84b receive part of the great load F, thereby reducing a moment applied to a joint portion between the fork shaft 80 and the shift fork 82. Accordingly, in the present embodiment, it is also possible to prevent the protrusions 84a, 84b from coming into contact with the sliding groove of the sleeve, thus reducing abrasion of the sliding groove.

As aforementioned, even if each protrusion 84a, 84b is formed in a triangular prism shape, it is possible to attain the same effect as that of the aforementioned embodiment. The shape of each protrusion 84a, 4b is not limited to a triangular prism shape or a rectangular parallelepiped shape, and the shape thereof is not limited as far as it is possible to receive a load transmitted from the shift fork 82 when the great load F is inputted.

Figure 6:
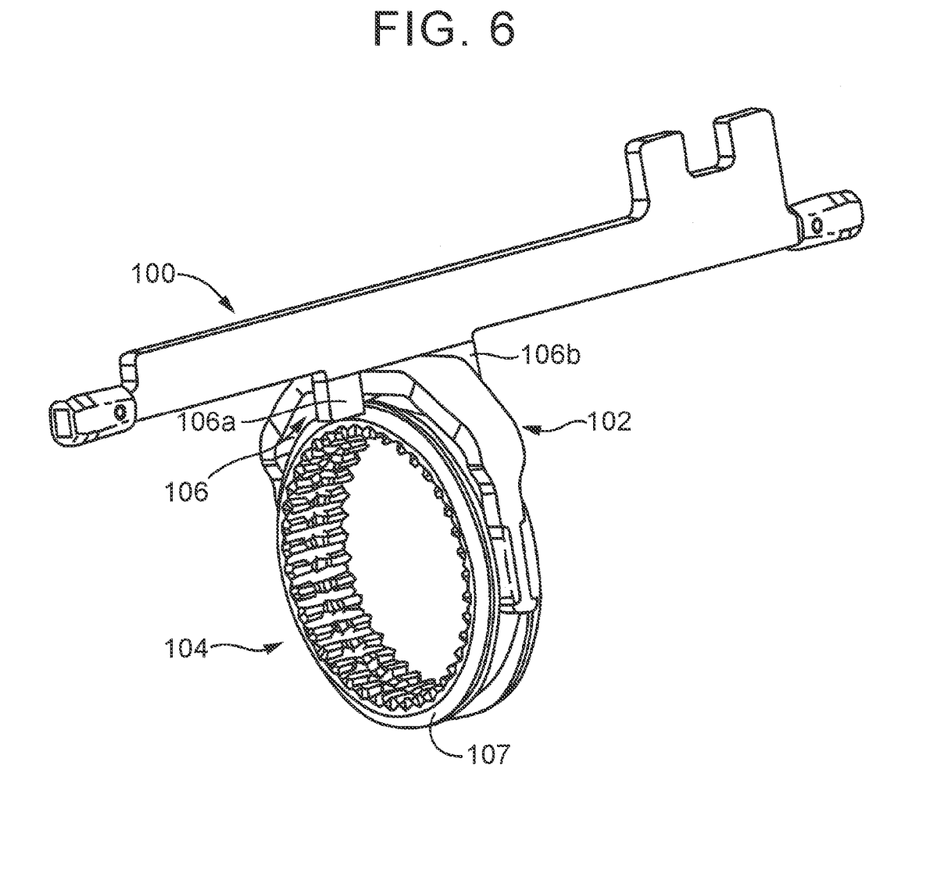
FIG. 6 is a perspective view showing structures of a shift fork shaft, a shift fork, and a sleeve that are applied to a vehicle manual transmission as further another embodiment of the present invention.

FIG. 6 is a perspective view showing shapes of a shift fork shaft 100 (referred to as a "fork shaft 100", hereinafter), a shift fork 102, and a sleeve 104 that are applied to the vehicle manual transmission as further another embodiment of the present invention.

In the aforementioned embodiment, the protrusions (66a, 66b, 84a, 84b) configuring the restricting member (66, 84) are formed in the fork shaft (34, 80). However, in the present embodiment, protrusions 106a, 106b configuring the restricting member 106 are formed in the shift fork 102. The shift fork 102 is formed in a substantially U-shape as viewed in the longitudinal direction of the fork shaft 100. The two protrusions 106a, 106b are formed at both sides of the shift fork 102 in the longitudinal direction of the fork shaft 100 in a manner as to be adjacent to the shift fork 102. The respective protrusions 106a, 106b are integrally formed with the shift fork 102, or integrally joined to the shift fork 102 through welding or the like. The protrusions 106a, 106b integrally formed with the shift fork 102 are joined to the fork shaft 100 through welding or the like. In this case, if the fork shaft 100 is viewed in the longitudinal direction of the fork shaft 100 with the shift fork 102 fitted to the sleeve 104, each protrusion 106a, 106b also extends to a position overlaid with a peripheral edge 107 of the sleeve 104 toward an axial center of the sleeve 104. Each protrusion 106a, 106b is located at a position that is not overlaid with a sliding groove formed on an outer peripheral surface of the sleeve 104 in the longitudinal direction of the fork shaft 100.

As aforementioned, in the case of forming the restricting member 106 in the shift fork 102, it is also possible to promote the same effect as that of the aforementioned embodiment. Specifically, if the great load F is inputted into the sleeve 104, it is possible to receive the great load F not only by the contact points between the both ends of the shift fork 102 and the sliding groove, but also by the restricting member 106; thus it becomes unnecessary to increase the rigidity of the shift fork 102. Since the sliding groove of the sleeve 104 is out of contact with the protrusions 106a, 106b, it is possible to suppress abrasion of the sliding groove.

Figure 7:
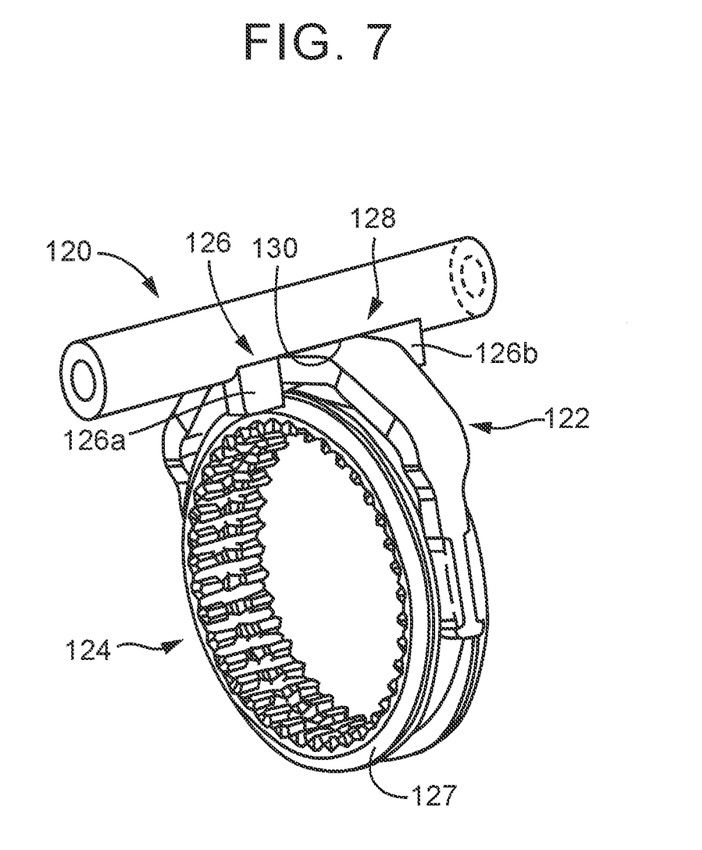
FIG. 7 is a perspective view showing structures of a shift fork shaft, a shift fork, and a sleeve that are applied to a vehicle manual transmission as further another embodiment of the present invention.

FIG. 7 is a perspective view showing shapes of a shift fork shaft 120 (referred to as a "fork shaft 120", hereinafter), a shift fork 122, and a sleeve 124 that are applied to the vehicle manual transmission as further another embodiment of the present invention. In the fork shaft 120 of the present embodiment, only a part in the vicinity of the joint portion between the fork shaft 120 and the shift fork 122 is illustrated.

As shown in FIG. 7, the fork shaft 120 of the present embodiment has a sectional surface formed in a cylindrical shape. In other words, the fork shaft 120 is configured by a cylindrical member. The shift fork 122 is formed in the same shape as that of the shift fork 102 of the aforementioned embodiment. In other words, the shift fork 122 is formed in a substantially U-shape as viewed in the longitudinal direction of the fork shaft 120. A restricting member 126 configured by two protrusions 126a, 126b is formed at both sides of the shift fork 122 in the longitudinal direction of the shift fork shaft 120.

A cut-out 128 is formed in the fork shaft 120. This cut-out 128 forms a joint surface 130 to be joined to the shift fork 122 in the fork shaft 120. The shift fork 122 is joined to the joint surface 130 through welding or the like. As aforementioned, even if the fork shaft 120 is formed in a cylindrical shape, each protrusion 126a, 126b is formed at a position in the shift fork 122 where each protrusion 126a, 126b can come into contact with a peripheral edge 127 of the sleeve 124, thereby promoting the same effect as that of the aforementioned embodiment.

As aforementioned, the embodiments of the present invention have been described in details with reference the drawings, and the present invention may also be applicable in other aspects.

For example, in the above described embodiment, the protrusions 68a, 68b are formed in such a manner that the distance between the shift fork shaft 34b and the sleeve 48b becomes the shortest, but the present invention is not limited to this. For example, the restricting member may be formed to extend from a position along the shift fork formed in a U-shape.

In the above described embodiment, the gaps L are formed between the protrusions 68a, 68b and the sleeve 48b in the longitudinal direction, but it is not always necessary to provide the gaps L, and the protrusions 68a, 68b may be adjacent to the sleeve 48b.

In the above described embodiment, the great load F is inputted into the sleeve at the time of the shift operation by the driver, but it may be configured that the shift fork shaft is moved in the longitudinal direction at the time of the selecting operation by the driver.

In the above described embodiment, the resin pads are fitted in the both ends of the shift fork, but the present invention may be implemented without using the resin pads.

In the above described embodiment, the protrusions 68a, 68b are provided at the both sides of the shift fork 35b in the longitudinal direction, but it may be configured to provide the protrusion at any one of the both sides in the longitudinal direction.

In the above described embodiment, the line passing through the contact points A1, A2, which come into contact with the sleeve 48b, of the resin pads 60a fitted in the both ends of the shift fork 35b extends to the position passing through the axial center C of the sleeve 48b, but the present invention is not limited to this. This means that the length of the shift fork is not limited to specific one in the present invention.

The above description is merely an embodiment, and the present invention may be implemented in variously modified and improved forms based on the knowledge of those skilled in the art.

What is claimed is:

1. A vehicle manual transmission comprising:
    each of shift fork shafts that is supported by the vehicle manual transmission such that the shift fork shaft is moved in a longitudinal direction in accordance with a gear shift operation by a driver;
    each of shift forks that is coupled with the shift fork shaft so as to be moved together with a movement of the shift fork shaft;
    each of sleeves that is formed in an annular shape, the sleeve including an annular sliding groove to be fitted to the shift fork on an outer peripheral surface of the sleeve, the sleeve including peripheral edges forming annular planes as viewed in the longitudinal direction of the shift fork shaft; and
    each of gear pieces that includes outer peripheral teeth to be meshed with inner peripheral teeth formed on an inner peripheral surface of the sleeve when the sleeve is moved in accordance with the gear shift operation,
    wherein
    the shift fork shaft includes a restricting member that abuts to the peripheral edge so as to restrict a movement of the sleeve in the longitudinal direction of the shift fork shaft, and
    the restricting member includes two protrusions that oppose each other with the shift fork interposed therebetween in the longitudinal direction of the shift fork shaft.

2. The vehicle manual transmission according to claim 1, wherein
    the restricting member is disposed at a position where a distance between the shift fork shaft and the sleeve becomes the shortest as viewed in the longitudinal direction of the shift fork shaft, and the position is adjacent to the shift fork in the longitudinal direction of the shift fork shaft.

3. The vehicle manual transmission according to claim 1, wherein
    the shift fork shaft is a press-formed plate member.

4. The vehicle manual transmission according to claim 3, wherein
    there is a predetermined gap between the restricting member and the sleeve in the longitudinal direction of the shift fork shaft.

5. The vehicle manual transmission according to claim 1, wherein there is a predetermined gap between the restricting member and the sleeve in the longitudinal direction of the shift fork shaft.

* * * * *